INVENTORS
ERNEST G. TIEGEL
RALPH G. TIEGEL

Schapp & Hatch
ATTORNEYS 3,413,728
METHOD AND APPARATUS FOR DRYING
CHARGED BATTERY PLATES
Ernest G. Tiegel, Redwood City, and Ralph G. Tiegel, San
Carlos, Calif., assignors to Tiegel Manufacturing Co.,
Belmont, Calif., a corporation of California
Continuation-in-part of application Ser. No. 494,658,
Oct. 11, 1965. This application Aug. 7, 1967, Ser.
No. 663,915
14 Claims. (Cl. 34—22)

ABSTRACT OF THE DISCLOSURE

An improved method and apparatus for drying assemblies of charged battery plates suitable for use in dry charged batteries in which fresh combustion gases are mixed with a fraction of prior used drying gas that has been cooled and had water removed therefrom to provide a heated mixture of low oxygen content gas to be passed through the battery plates for controlled drying thereof; the invention also provides for improved features, such as the cooling of the used gas by direct impingement with a cold water spray, the use of a mist eliminator to take discrete water particles from the gas so cooled, and the use of a positive pressure within the drying apparatus to positively prevent contamination by leakage from external atmosphere.

---

Figure 1:
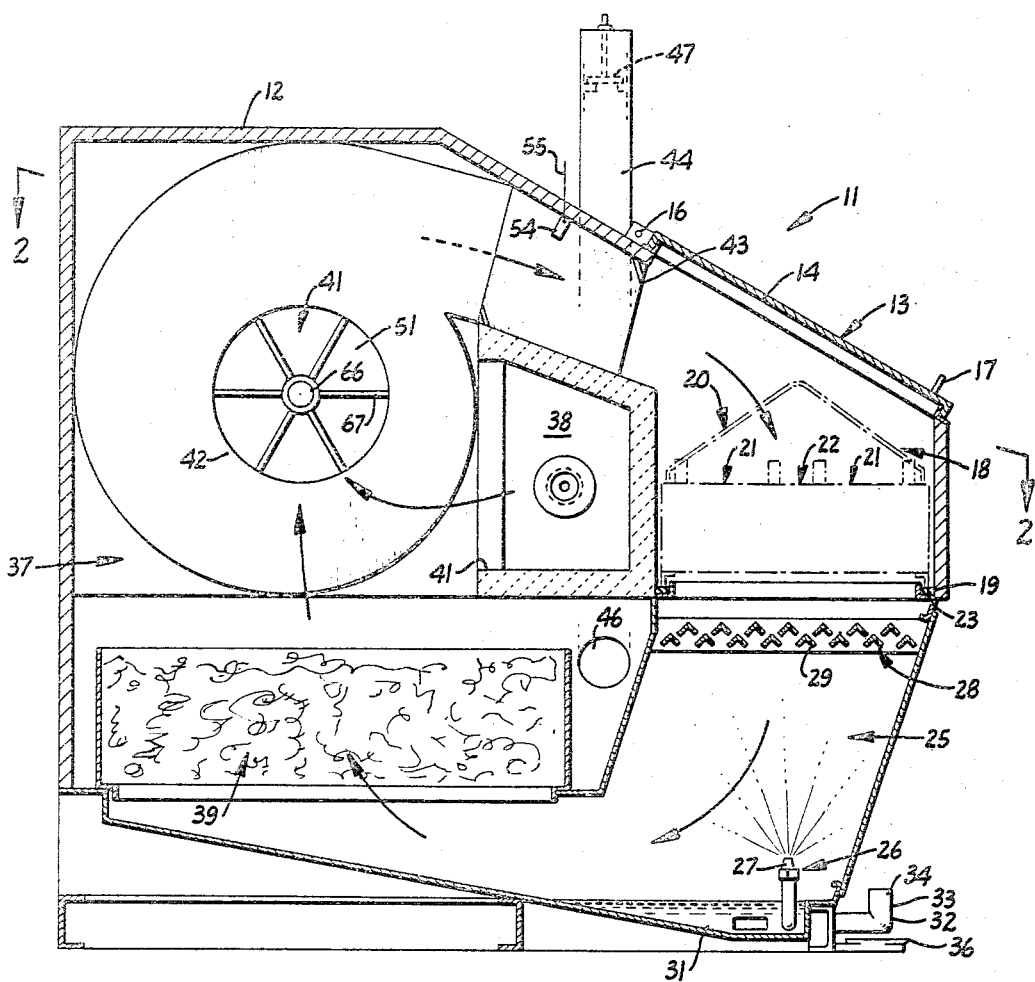

*Cross-reference to related application.*—This application is a continuation-in-part of our co-pending application Ser. No. 494,658, filed Oct. 11, 1965, now abandoned, and relates to improvements in a method and apparatus for drying charged battery plates. More particularly, this invention relates to an improved method and apparatus for drying assemblies of charged battery plates suitable for use in dry charged batteries.

*Background of the invention.*—It has been found advantageous to place common storage batteries on the market in dry form, with the plates fully charged, but with the electrolyte removed so as to substantially prevent chemical action until the battery is sold for actual use. The electrolyte is added to complete the battery.

Various methods have been used for making dry charged batteries, but the method described and claimed in United States Patent 3,038,018 has certain advantages and the method described in that patent is particularly applicable to the present invention. Specifically, the patented method provides a procedure in which the entire charged battery unit, including positive plates, negative plates and separators, are charged, and then washed and dried without dissasembling the unit.

This procedure is rendered possible by utilizing controlled conditions under which the unit is handled in order to prevent damage to the charged condition of the battery by excess oxygen or by short circuiting of the plates during washing and the like. However, the chief advantage resides in the ability to handle groups or units of charged battery elements, and the present improvement is directed specifically to a machine for carrying out the drying operation in which charged battery units are to be dried without injury thereto. Although the present invention is particularly applicable for carrying out the drying operation of the procedure set forth in United States Patent 3,038,018, it will be appreciated that the invention will be suitable for drying charged battery plates in many other processes for making dry charge batteries.

Prior to this invention, it was generally considered necessary to dry at relatively high temperatures, and the use of the higher temperatures required drying the negative and positive plates separately. In addition, the accumulation of lead dust in the dry apparatus was a serious problem that is overcome by the present invention.

*Summary of the invention.*—It is therefore a primary object of the present invention to provide a method and apparatus for drying charged battery plates, in which the battery plates are subjected to safe conditions during the drying process, with means being provided for positively preventing excess heat, oxygen or other factors from damaging the plates.

Another object of the invention is to provide a method and apparatus for drying charged battery plates in which a stream of substantially oxygen-free drying gas is provided at a controlled increased temperature for drying; and in which a fraction of the same gas is cooled to remove water without the use of condensers and the like, reheated, and recycled for additional drying.

A further object of the invention is to provide a method and apparatus of the character described in which a pressurized system is used to positively prevent leakage of outside air into the system which would tend to contaminate the desired atmosphere within the system with excessive concentrations of oxygen.

A still further object of the invention is to provide a machine for drying charged battery plates of the character described in which a relatively low drying temperature is utilized in order to permit the use of various kinds of insulated baskets which prevent discharge of the battery plates under drying conditions.

Yet another object is to provide a method of drying charged battery plates in which low temperature oxygen-free drying conditions are utilized in order to prevent positive plate deterioration due to high drying temperature and to retain the metallic sponge-like qualities of the negative plates which are desired.

Still another object of the invention is to provide an apparatus for drying charged battery plates which is compact and relatively inexpensive to produce, and which has a minimum of moving parts and excellent reliability.

Further objects and advantages of the invention will become apparent as the specification proceeds, and the new and useful features of the invention will be fully defined in the claims attached hereto.

In its method form, the invention generally comprises the steps of placing charged battery plates in a drying chamber, providing a stream of substantially oxygen-free drying gas by mixing cold, substantially oxygen-free gas of high relative humidity with hot, substantially oxygen-free combustion gases, and passing said stream of drying gas through the drying chamber containing the battery plates to be dried. The drying gases should be of a relatively low temperature in order to avoid injury to the charged battery plates, and are preferably of not more than about 200° F. or less. On the other hand, the drying gases should not be of an unduly low temperature because the drying period would be correspondingly extended. Accordingly, the range of temperautres used should be between about 100° F. and 250° F., and preferably the temperature will be adjusted in the range of from, say, 170° F. to 185° F. In fact, with the apparatus of this invention, the temperature can be regulated accurately at 180° F., if desired.

By using lower drying temperature, it is practical to dry the positive and negative plates together while they are still in the forming rack. This re ults in a more rapid process, and in the reduction of handling. In this regard, drying temperatures as low as 150° F. have been found to be satisfactory.

The gases should also be substantially oxygen-free, that is, of an order of less than, say, 1% oxygen by volume. In order to provide drying gas at this temperature and at this low oxygen value, we prefer to mix previously used drying gas which has the moisture removed therefrom with a fraction of combustion gas with both streams having the desired low oxygen content. In this way, the temperature of the drying gas may be regulated by regulation of the fractions of each component used.

Another important feature of this invention resides in the manner of removing water from the used drying gas so that the used gas may be recycled and be available for mixing with newly formed combustion gas to provide a drying gas mixture as mentioned above. Obviously, the substantially saturated used drying gas may be cooled in a condenser and have moisture taken out by that means. However, we prefer to cool the gas directly by a cold water spray. Of course, the cold water is in direct contact with the gas from which the water is to be removed, but since the gas is already substantially saturated, water is taken out of the gas instead of being put into it. Accordingly, this cold water spray is an extremely efficient way of removing moisture from the spent drying gas. In addition, the spray is inexpensive and may be collected conveniently in a sump, together with the water removed from the gas by the cooling procedure. This water is warm and relatively pure and can be used for washing the battery elements prior to drying.

The use of the cold water spray is particularly valuable in the removal of lead dust from the dryer as well as in the efficient heat exchange achieved. Prior devices utilizing condensers have encountered difficulties caused by the accumulation of dust on the condenser surfaces. The present invention not only overcomes this problem, but also provides a cleaner drying atmosphere.

The temperature of the cold water is not critical, so long as it provides cooling, but the colder the water, the more efficient the removal of water from the spent drying gas. The usual cold water tap is quite satisfactory since this water is always lower than about 100° F. and usually below 70° F. In fact, after running awhile, it often has the usual "ground" temperature of about 40° F.

The spraying step provides excellent condensation of moisture from the gases. However, the spraying step also provides an atmosphere laden with mist. Accordingly, we prefer to pass this cold, saturated gas through a mist eliminator before mixing it with combustion gas and recycling the mixture.

The mist eliminator may be any suitable mechanism capable of removing droplets of water and handling large volumes of gas, such as a filter screen or cyclone. The exact conditions of operation are not critical so long as moisture is continuously removed from the air to compensate for the moisture picked up during the drying operation. Of course, the colder the cold water spray, the more efficient the operation will be. However, excellent results are obtained when the mixture of the recycled gas and the products of combustion have a temperature of about 180° F. and a dew point of 140° or less.

Precautions should also be taken to prevent contamination of these drying streams and it is preferred to carry out the method in a unitary apparatus such as the apparatus illustrated in the drawings. However, it will be appreciated that a continuous system could be provided as well as the batch dryer illustrated herein. In such a case, the drying chamber would be in the form of a tunnel through which the plates would be conveyed using air doors or a suitable automatic door system at each end of the tunnel. The drying atmosphere would be prepared and circulated through the tunnel in the same way it is prepared and circulated through the drying chamber illustrated below, except that flow would preferably be countercurrent to the direction of the movement of the plate assemblies passing through the dryer.

While the specific form of apparatus shown herein is a batch dryer, it will be appreciated that the apparatus would be modified to provide a continuous drying machine as explained above. Thus, in its apparatus form, a machine is provided which comprises an enclosed housing capable of maintaining a slightly superatmospheric pressure therein, with the housing being divided into a plurality of chambers interconnected so that the stream of gas may be cycled and recycled continuously therethrough. The chambers required will include a drying chamber within the housing equipped with means for supporting battery plates to be dried, a cooling chamber having water spray means positioned to contact streams of gas after movement of said streams through the drying chamber, a combustion chamber for providing relatively hot, dry, substantially oxygen-free gas, with the combustion chamber being placed outside of the series of cyclic chambers, and means for bringing the gases from the combustion chamber into the cycle of operative chambers, including means for mixing the stream of cold air after passage through the water spray with the hot, dry, substantially oxygen-free combustion gas.

Figure 2:
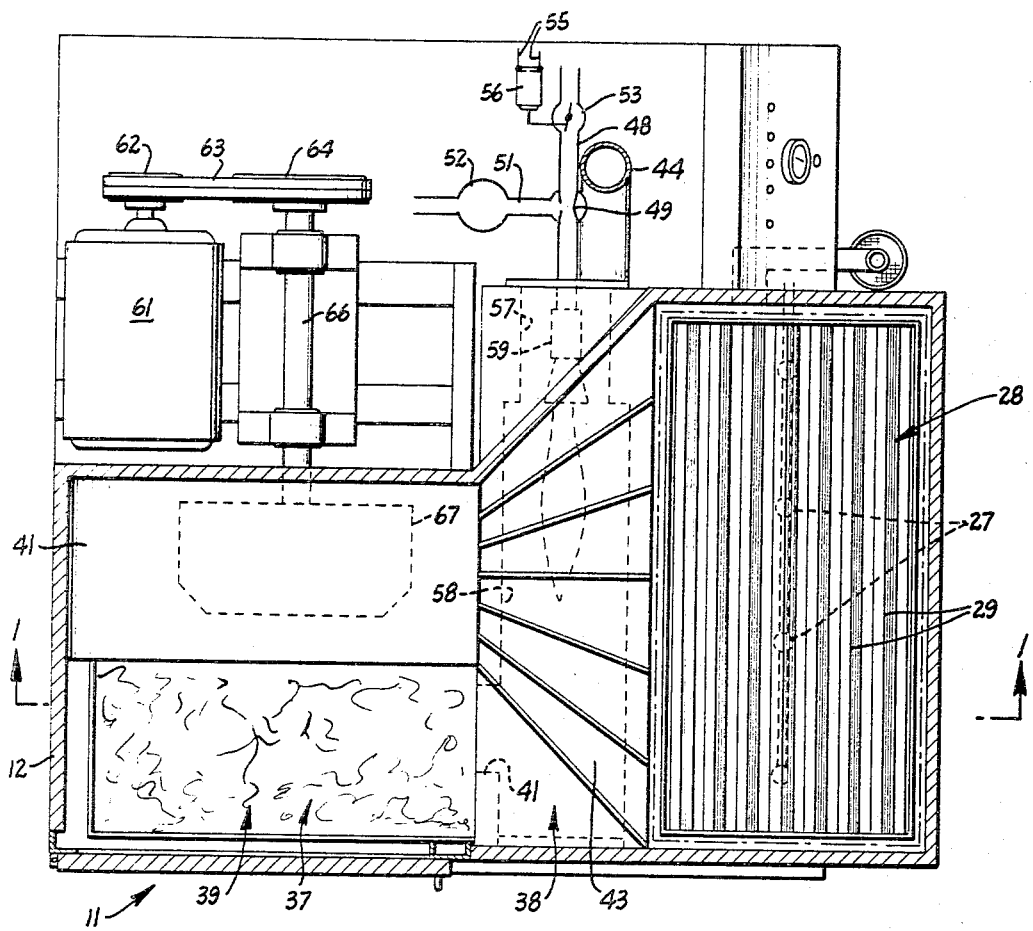
Figure 3:
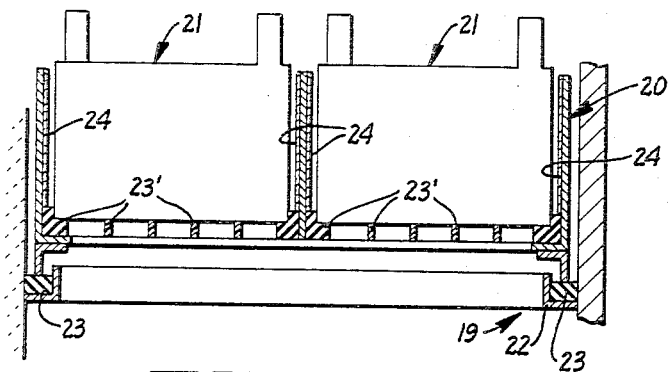

*Brief description of the drawings.*—The preferred form of the invention is illustrated in the accompanying drawings, forming a part of this description, in which:

FIGURE 1 is a vertical section taken through the machine substantially in the plane of line 1—1 of FIGURE 2;

FIGURE 2, a plan view of the machine with the cover removed in order to illustrate internal parts with the view being indicated by the line 2—2 of FIGURE 1; and FIGURE 3, an enlarged cross-sectional view illustrating in greater detail the placement of charged battery plates in the apparatus shown in the drawings.

While we have shown only the preferred form of our invention, it should be understood that various changes or modifications may be made within the scope of the claims attached hereto without departing from the spirit of the invention.

*Description of the preferred embodiment.*—Referring to the drawings in greater detail, there is shown in FIGURES 1 through 3 an apparatus for drying charged battery plates in the form of a unitary machine 11 comprising an enclosed housing 12 capable of maintaining a superatmospheric pressure therein, and equipped with a suitable door 13 constructed for providing access into the machine whereby battery plates to be dried may be placed into and removed from the machine. As here shown, the door 13 is constructed of a rectangular plate 14 carried on suitable hinges 16 and provided with a handle 17 to facilitate opening. The door is also equipped with suitable gaskets (not shown) or other conventional sealing material so as to provide a sealing closure.

The housing 12 also contains suitable partitions therein so that its inner volume is divided into a plurality of chambers interconnected so that a stream of gas may be cycled and recycled continuously therethrough. As best seen in FGIURE 1, these chambers include a drying chamber 18 which is disposed next to the door 13 and equipped with support means 19 for holding baskets 20 containing groups of battery plates 21 in drying position. Preferably, the support means 19 includes suitable frame members 22 which are equipped with suitable sealers 23 constructed of suitable material to prevent by-pass of drying gases. In addition, the baskets 20 are constructed with insulating coatings 24 made of glass or the like and insulators 23' on which the battery plates rest to prevent short circuiting between the battery plates as they are supported in drying position. The support means 19 and basket 20 are constructed to allow free flow of drying gas therethrough in close contact to the battery plates.

On the downstream side of the drying chamber, there is provided a cooling chamber 25 in which moisture is condensed from the used drying gases received from the drying chamber 18. This cooling is achieved by direct impingement of cold water emanating from the spray units 26 equipped with suitable spray nozzles 27 for providing fine spray and excellent contact with the atmosphere within the cooling chamber 25. In order to prevent the water spray from inadvertently entering the drying chamber and preventing proper drying of the battery plates therein, baffle means 28 is provided to form a partition between the two chmabers in a way that will permit passage of air or gases between chambers, but positively prevent the passage of water from the spray in the reverse direction. As here shown, the baffle means 28 comprises a series of elongated, inverted, V-shaped members 29 disposed in overlapping fashion and extending throughout the entire partition area between chambers.

At the bottom of the cooling chamber 25 there is provided a suitable collection sump 31 formed by the housing 12 which is constructed with suitable inclined sides and adapted to carry water below the spray nozzles 27. A suitable out-flow pipe 32 is provided which is constructed with a suitable trap 33 or equivalent means to allow outflow of water while retaining sufficient water in the bottom of the apparatus to provide a seal against entry of air through the out-flow pipe.

As here shown, the trap 33 is obtained by providing a vertical section of pipe opened at its upper end 34 so that water may overflow therefrom into the opening 36 of a suitable drain. Since the apparatus is designed to carry gases within at a positive pressure of, say, two or three inches of water, it is important that the trap 33 be of sufficient length to accommodate this additional pressure and still provide a positive seal.

On the downstream side of the cooling chamber 25, there is located a collecting and pre-mixing chamber 37 which is equipped to receive the cooled gases from the cooling chamber 25 as well as combustion gases from a combustion chamber 38. In order to assure that all of the droplets of moisture are removed from the atmosphere in cooling chamber 25, means is provided at the partition between the cooling chamber 25 and the chamber 37 for removing droplets of water. As shown in FIGURE 1, this means comprises a mist eliminator 39, in the form of wire screening such as is used in wire filters, with the screening serving as a partition between chambers.

In the embodiment shown in the drawings, chamber 37 is in an upper corner of the machine, with the used drying gases entering through mist eliminator 39 from the bottom of the chamber, and the newly provided combustion gases entering through an opening 41 at the side of the chamber from combustion chamber 38. Located at one side of the chamber 37 is a suitable fan 41 having an intake 42 in the side of chamber 37, and an outlet duct 43 leading to drying chamber 18. Complete mixing of the combustion gases and the used drying gases occurs within the centrifugal fan 41.

Since the apparatus is designed to maintain a slight positive pressure within, and additional gases are being introduced into the apparatus during operation in the form of combustion gases, it is necessary to provide an outlet for an equivalent amount of gas. Preferably, gas which has already been used for drying will be removed in order to increase the efficiency of the apparatus, and a suitable outlet duct will be provided either in the cooling chamber 25 or in a portion of the chamber 37 where combustion gases are unlikely to flow. As here shown, exhaust duct 44 is provided with its inlet opening at 46 within the lower portion of the chamber 37 and below the combustion chamber 38. With this construction, gases from cooling chamber 24 will selectively pass through duct 44 instead of from combustion chamber 38, because the centrifugal fan 41 will draw all of the combustion gas 38 into the fan.

In order to control the passage of excess exhaust gas through duct 44, a valve 47 is provided which is similar to a pressure reducing valve in that it allows air to pass therethrough when a certain adjusted positive pressure is exceeded, but remains closed when the pressure falls below the adjusted value. Accordingly, by providing the desired adjustment on valve 47, the desired positive pressure of the atmosphere within the apparatus may be positively maintained. In this way, any slight tendency for small leakage, particularly around the door 13, will allow gases to escape to the outside atmosphere instead of allowing air to enter the apparatus. In this way, contamination of the drying gases through leakage is also positively avoided.

From the foregoing description, it is seen that we have provided an apparatus which will recycle gases of low oxygen content through a means for removing water therefrom so that additional drying may be achieved by mixture of said gases with fractions of hot combustion gases. The heat from the combustion gases will provide the desired temperature rise in the recycled gas to bring it to a dry state so that it will pick up moisture in the drying chamber. By utilizing this mixture, the temperature of the drying gas may be controlled accurately, while still obtaining the maximum benefit of the heating value of gas used in the combustion chamber.

It will be appreciated that the drying temperature will be a factor of the amount of combustion gas put into the apparatus, since the amount of spent drying gas which is exited from the apparatus will be substantially equivalent to the amount of combustion gas provided. Therefore, control of the apparatus may be positively obtained by control of the amount of combustion gas. In addition, it will be appreciated that the combustion gas should have a low oxygen content (of less than about one percent by volume) and that this oxygen content may be adjusted by controlling the air-fuel mixture provided to the combustion chamber at a desired constant value.

As here shown, air is provided through air line 48 from a source of air under a controlled pressure such as a blower or a compressed air tank (not shown). The air line 48 has a venturi 49 at a junction point with gas line 51 so that the air picks up gas by the aspirator effect. The gas line 51 is equipped with a suitable device 52 to regulate the downstream pressure. With this arrangement, a substantially constant air-gas mixture is assured. The amount of the mixture is controlled by valve 53 located in air line 48.

In order to control the temperature of the drying gas mixture, the valve 53 is made responsive to the temperature of the drying gas in outlet duct 43. In order to achieve this result, a thermostat 54 is placed in duct 43, and valve 53 is made responsive to the temperature conditions measured by the thermostat in any of the usual ways for this type of automatic control. As here shown, an electric signal is obtained from the thermostat which is electrically connected to servo motor 56 through wires 55. The servo motor then drives valve 53 toward the open or closed position in response to changes of the temperature in duct 43.

As best seen in FIGURE 2, the combustion chamber 38 is divided into a precombustion section 57 and a main section 58 where burning is substantially completed before the combustion gases exit from the chamber through opening 41. In order to positively assure combustion, a suitable electronic flame rod 59 is provided in the precombustion chamber 47 to assure ignition in accordance with known procedures for gas combustion burners.

Although the apparatus of this invention is designed to utilize gas and air, it will be appreciated that other fuels such as oil could be used, if desired. In such a case, the combustion chamber should be constructed to accommodate oil burning so that combustion gases will be provided through opening 41, with the combustion gases having less than, say, about one percent oxygen.

As here shown, the centrifugal fan 41 is also driven by a suitable electric motor 61 operating through a drive pulley 62 and belt 63 to driven pulley 64, which transmits rotation through shaft 66 to the rotor 67 of the fan. Once again, it will be appreciated that any suitable drive means may be provided for driving the fan, but that an electric motor is preferred in most cases for the sake of convenience.

In operation, the door 13 of the apparatus is opened and the basket 20 containing the battery plates or battery plate assembly to be dried is inserted. The door is closed and the apparatus is turned "on" by any suitable control system (not shown). For example, we prefer to use a timer such as the timer used on home dryers which provides an "on" condition to all of the operating parts for a set period of time. With this control, all parts are turned on and off electrically. The electric motor for the fan, the air valve and ignition system are already electrical, and the water spray is controlled by a solenoid valve. If desired, a safety switch may also be provided on the door.

With the battery plates in position, and the timer set, the fan, combustion chamber and water spray are turned on and the machine is operated until the battery plates are dry. The drying time will be found by experimentation, and suitable suggested times are given for each machine. After the required time period elapses, the machine is turned "off," the door opened and the battery plates removed.

It may be observed that some entry of air into the machine occurs when the door is opened between batches. However, this is not serious because the addition of low oxygen combustion products and removal of part of the used drying gas soon purges excess oxygen. Similarly, when the machine is tested from a cold start (first batch), it is found that the desired low atmosphere is obtained in the drying chamber soon enough during or after heating that excellent results are obtained under such conditions.

It will also be appreciated that the use of baskets for holding the battery plates to be dried is advantageous, although not essential. These advantages include facility in handling, not only in the drying apparatus but also in the charging, washing and rewetting of the battery elements. The baskets are designed so that they fit into the apparatus and form a seal therein, and the door is designed large enough to permit rapid loading and unloading of the baskets.

From the foregoing description, it is seen that we have provided a simple method for drying charged battery plates in which the desired control of the drying gas is obtained in an efficient manner, and that we have provided an apparatus for carrying out this method which is compact efficient, and automatic in operation.

We claim:

1. A method of drying charged battery plates which comprises the steps of placing the charged battery plates in a drying chamber, providing a stream of substantially oxygen-free drying gas of relatively low humidity at a temperature of from about 100° F. to about 250° F. by mixing cold substantially oxygen-free gas of high relative humidity with hot substantially oxygen-free combustion gases of low relative humidity, and passing said stream of drying gas through the drying chamber containing the plates to be dried, said cold substantially oxygen-free gas of high relative humidity being provided by intimately contacting the stream of drying gas which has passed through the drying chamber with a cold water spray to lower the temperature thereof and to remove water therefrom.

2. A method of drying charged battery plates which comprises the steps of placing the charged battery plates in a drying chamber, providing a stream of substantially oxygen-free drying gas of relatively low humidity at a temperature of from about 100° F. to about 250° F. by mixing cold substantially oxygen-free gas of high relative humidity with hot substantially oxygen-free combustion gases of low relative humidity, said substantially oxygen-free gas of low relative humidity being provided by effecting combustion between a controlled stream of fuel and a controlled stream of air in which the control is sufficient to provide a substantially oxygen-free combustion product, and passing said stream of drying gas through the drying chamber containing the plates to be dried, said cold substantially oxygen-free gas of high relative humidity being provided by intimately contacting the stream of drying gas which has passed through the drying chamber with a cold water spray to lower the temperature thereof and to remove water therefrom.

3. The method of drying charged battery plates defined in claim 2, in which means are provided for separation of discrete particles of water from the gas which is cooled in the water spray prior to mixing of said gas with the hot combustion gases.

4. The method of drying charged battery plates defined in claim 3, in which the entire system of gases is kept under a positive pressure by the controlled removal of excess gases to compensate for the intake of raw materials which are used to effect combustion.

5. The method of drying charged battery plates defined in claim 3, in which the atmosphere within the dryer is maintained at all times at a temperature of between about 170° F. and 180° F. and with less than about one percent free oxygen.

6. An apparatus for drying charged battery plates, comprising an enclosed housing capable of maintaining a positive air pressure therein, a drying chamber within the housing having means for supporting battery plates to be dried in position to allow streams of dry air to be moved therepast in juxtaposed position thereto, water spray means positioned to contact streams of air after movement of said streams through the drying chamber to cool the air and lower the absolute humidity thereof, a combustion chamber for providing relatively hot, dry, substantially oxygen-free gas, means for mixing the stream of cold air after passage through the water spray with the hot, dry, substantially oxygen-free gas to produce a drying gas stream of relatively low humidity at a temperature of from about 100° F. to about 250° F., and means for directing the mixed drying stream through the drying chamber.

7. The apparatus for drying charged battery plates defined in claim 6, in which barrier means are provided between the cooling chamber and the drying chamber, said barrier means being formed to prevent water from the spray from entering the drying chamber, while at the same time permitting the flow of drying gases therethrough.

8. The apparatus for drying charged battery plates defined in claim 7, in which filter means are provided at the exit side of said cooling chamber to remove small discrete particles of moisture from the air which have been cooled in the cooling chamber.

9. The apparatus for drying charged battery plates defined in claim 8, in which the cooling chamber is equipped with means for collecting water at the lower portion thereof and means for removing water which includes a trap to prevent the entry of gas through said means.

10. An apparatus for drying charged battery plates, comprising an enclosed housing capable of maintaining a positive air pressure therein, a drying chamber within the housing having means for supporting battery plates to be dried in position to allow streams of dry air to be moved therepast in juxtaposed position thereto, water spray means positioned to contact streams of air after movement of said streams through the drying chamber to cool the air and lower the absolute humidity thereof, a combustion chamber for providing relatively hot, dry, substantially oxygen-free gas, a fuel line in communication with said combustion chamber for providing fuel and air therein, means to control the relative proportions of fuel and air to provide combustion gases having an oxygen content of less than, say, about one percent, said combustion chamber also having an opening for passage of combustion gases therefrom with the opening being positioned within said housing, means for directing gases in cyclic fashion from a position near the outlet passage of the combustion chamber, through the drying chamber, through the cooling chamber, and back past the original position specified, and vent means being provided with a control for maintaining a slight positive pressure of gases within the housing whereby air leakage from the outside atmosphere is positively avoided.

11. The apparatus for drying charged battery plates defined in claim 10, in which barrier means are provided between the cooling chamber and the drying chamber, said barrier means being formed to prevent water from the spray from entering the drying chamber, while at the same time permitting the flow of drying gases therethrough.

12. The apparatus for drying charged battery plates defined in claim 11, in which filter means are provided at the exit side of said cooling chamber to remove small discrete particles of moisture from the air which have been cooled in the cooling chamber.

13. The apparatus for drying charged battery plates defined in claim 12, in which the cooling chamber is equipped with means for collecting water at the lower portion thereof and means for removing water which includes a trap to prevent the entry of gas through said means.

14. The apparatus defined in claim 10, in which the means for supporting battery plates to be dried comprises a removable basket having an open bottom formed with support elements constructed of insulating material for holding groups of battery plates in an upright position in parallel alignment, and means for sealingly supporting the basket whereby substantially all of the drying air passes through the open bottom of the basket.

References Cited

UNITED STATES PATENTS

| | | | |
|---|---|---|---|
| 1,019,999 | 3/1912 | Tiemann | 34—75 |
| 1,310,871 | 7/1919 | Martin | 136—33 |
| 2,889,388 | 6/1959 | Csapo | 136—33 |
| 2,911,457 | 11/1959 | Sabatino et al. | 136—33 |
| 3,038,018 | 6/1962 | Tiegel | 136—33 |

KENNETH W. SPRAGUE, *Primary Examiner.*